United States Patent
Kitsu et al.

(10) Patent No.: US 7,841,600 B2
(45) Date of Patent: Nov. 30, 2010

(54) SEAL MEMBER FOR ENGINE COVER OF OUTBOARD MOTOR

(75) Inventors: Kunihiro Kitsu, Wako (JP); Makoto Yazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 11/707,314

(22) Filed: Feb. 16, 2007

(65) Prior Publication Data

US 2007/0210531 A1    Sep. 13, 2007

(30) Foreign Application Priority Data

Mar. 7, 2006    (JP) .............................. 2006-061391

(51) Int. Cl.
*F16J 15/10*  (2006.01)
*F16J 15/48*  (2006.01)
*B63H 20/32*  (2006.01)

(52) U.S. Cl. ......................................... 277/645; 440/77

(58) Field of Classification Search ................. 277/645, 277/646; 49/477.1, 498.1; 440/77

See application file for complete search history.

(56) References Cited

U.S. PATENT DOCUMENTS

| | | | | |
|---|---|---|---|---|
| 2,700,196 A | * | 1/1955 | Panhard ................. | 52/204.597 |
| 4,067,146 A | * | 1/1978 | Mesnel et al. ............... | 49/490.1 |
| 4,310,164 A | * | 1/1982 | Mesnel ........................ | 277/642 |
| 4,411,941 A | * | 10/1983 | Azzola ........................ | 428/122 |
| 4,667,966 A | * | 5/1987 | Oehrle et al. ................ | 277/645 |
| 4,702,039 A | * | 10/1987 | Bocchinfuso .............. | 49/490.1 |
| 4,930,790 A | * | 6/1990 | Sheridan ...................... | 277/630 |
| 4,970,102 A | * | 11/1990 | Guillon ....................... | 428/122 |
| 4,976,069 A | * | 12/1990 | Arima et al. ................ | 49/490.1 |
| 5,018,998 A | * | 5/1991 | Kato ............................ | 440/77 |
| 5,096,208 A | * | 3/1992 | Westberg ..................... | 277/641 |
| 5,135,239 A | * | 8/1992 | Kato et al. ................... | 277/645 |
| 5,267,739 A | * | 12/1993 | Vaughan ..................... | 277/642 |
| 6,190,219 B1 | * | 2/2001 | Meier et al. .................. | 440/77 |
| 6,684,575 B2 | * | 2/2004 | Oda et al. ................... | 49/498.1 |
| 6,699,083 B2 | * | 3/2004 | Rinzaki et al. ............... | 440/77 |
| 6,877,279 B2 | * | 4/2005 | Russell et al. .............. | 49/498.1 |
| 7,201,623 B1 | * | 4/2007 | Krupp et al. ................. | 440/77 |
| 7,249,985 B2 | * | 7/2007 | Fukuoka et al. .............. | 440/77 |
| 7,316,596 B2 | * | 1/2008 | Kameoka ..................... | 440/77 |
| 2002/0178656 A1 | * | 12/2002 | Nozaki et al. ................ | 49/441 |
| 2006/0141877 A1 | * | 6/2006 | Kameoka ..................... | 440/77 |

FOREIGN PATENT DOCUMENTS

JP    63-89397    6/1988
JP    02-292575    12/1990

* cited by examiner

*Primary Examiner*—Alison K Pickard
(74) *Attorney, Agent, or Firm*—Carrier, Blackman & Associates P.C.; William D. Blackman; Joseph P. Carrier

(57) ABSTRACT

A seal member seals a gap between upper and lower cover members of an engine cover of an outboard motor. The seal member includes a supporting portion and a sealing portion integral with the supporting portion. The supporting portion has such a high spring modulus that the supporting portion is not plastically deformed with a load is applied to the supporting portion when the upper cover member is locked to the lower cover member. The sealing portion is hollow and has such a small spring modulus that the sealing portion can readily flex into close contact with the upper and lower cover members so as to provide an improved seal between the upper and lower cover members.

10 Claims, 5 Drawing Sheets

SEAL MEMBER FOR ENGINE COVER OF OUTBOARD MOTOR

FIELD OF THE INVENTION

The present invention relates to a seal member sealing a gap between upper and lower cover members of an engine cover of an outboard motor.

BACKGROUND OF THE INVENTION

Engine covers of outboard motors include upper and lower cover members covering upper and lower halves of outboard motors. The upper and lower cover members are releasable from each other for the purpose of maintenance or adjustment of the engines. Seal members are interposed between the upper and lower cover members for sealing gaps between the upper and lower cover members.

The above type of seal members are known, for example, JP-U-63-89397 and JP-A-02-292575. JP-U-63-89397 discloses two seal members. The first one is an inverted-U-shaped water-proof member covering an erected lug formed at an outer peripheral edge of an upper part of a lower cover member. The second one is a water-proof member is located inside the first seal member and fitted into a hole formed on the upper part of the lower cover member. Since the number of the seal members for the lower cover member is two, the number of components of an outboard motor is greater and thus the number of steps for assembling an outboard motor is also greater. As a result, the cost for the outboard motor is higher.

JP-A-02-292575 discloses a seal member including a U-shaped base portion, a side lip projecting outwardly from outer side of the base portion, and a main lip projecting from a lower end of the base portion. The base portion of the seal member is fitted with an attachment rib projecting downwardly from a lower end of an inner peripheral edge of an upper cover member. The side lip abuts on an upper end of an outer periphery of a lower cover member when the upper cover member is attached to the lower cover member. The main lip is hollow and has a ring-shape. The main lip abuts on an upper end of an inner periphery of the lower cover member so as to seal a gap between the upper and lower cover members when the upper and lower cover members are attached to each other.

The main lip provides a watertight seal between the upper and lower cover members and, due to its hollow structure or ring-shape, has a reduced resiliency. Therefore, the main lip can not readily resume its original shape when undergoing plastic deformation. As a result, a reduced load is applied from the upper cover member to the lower cover member when the upper cover member is locked to the lower cover member. Where the ring-shaped main lip is compressed into a flattened state when the upper cover member is locked to the lower cover member, the height set on the basis of resilient force of the main lip can not be maintained. In this case, this main lip height should be maintained by additional means. However, such use of additional means leads to more complex structure or higher cost of the upper and lower cover members.

The reduced load on the lower cover member adversely affects sealing between the upper and lower cover members. Further, with the reduced load applied to the lower cover member, the upper cover member can be less reliably locked to the lower cover member.

SUMMARY OF THE INVENTION

An object of the present invention is to provide a single seal member which seals a gap between upper and lower cover members without reducing a load applied to the lower cover member when the upper and lower cover members are attached to each other.

According to one aspect of the present invention, there is provided a seal member for sealing a gap between upper and lower cover members of an engine cover of an outboard motor, the upper cover member being releasably attached to the lower cover member, the seal member comprising: a supporting portion disposed on a lower end portion of the upper cover member for supporting the upper cover member relative to the lower cover member; a hollow sealing portion formed integrally with an engine-compartment side of the supporting portion and disposed between an inner peripheral part of a lower end portion of the upper cover member and an outer peripheral part of the upper end portion of the lower cover member such that the hollow sealing portion becomes substantially compressed when the upper cover member and the lower cover member are locked together and the outboard motor is operating; the supporting portion having a large spring modulus; the sealing portion having a spring modulus smaller than the spring modulus of the supporting portion; and the supporting portion being disposed beneath a lowermost end surface of the upper cover member.

Since the supporting portion has the large spring modulus, the supporting portion can bear a load from the upper cover member in such a manner as to undergo only a small amount of plastic deformation when the upper cover member is locked to the lower cover member. This small amount of plastic deformation of the supporting portion makes it possible to minimize reduction in load applied to the lower cover member. Therefore, the upper cover member can be stably locked to the lower cover member for a long period of time.

The hollow sealing portion can seal a gap between the upper cover member and the lower cover member. Since the sealing portion has the smaller spring modulus than the spring modulus of the supporting portion, the sealing portion can readily deform conforming to the configuration of the outer periphery of the upper end portion of the lower cover member. Accordingly, the sealing portion can reliably seal the gap between the upper and lower cover members in close contact with the outer periphery of the upper end portion of the lower cover member.

This single seal member according to the present invention serves the following two contradictory functions: (1) to bear a load from the upper cover member when the upper cover member is locked to the lower cover member; and (2) to deform following the configuration of the outer periphery of the upper end portion of the lower cover member in sealing the gap between the upper and lower cover members. As a result, use of the seal member makes it possible to reduce the number of components of the engine cover as well as the number of steps for assembling the engine cover. These reductions in the number of the engine cover components and the assembling steps achieve reduction in cost of the engine cover.

Preferably, the supporting portion is attached to the lower end portion of the upper cover member.

Desirably, the supporting portion is solid and includes a seal lip formed on a bottom surface and tapering to be narrower in a downward direction of the supporting portion, the seal lip having a small spring modulus. Thus, the supporting portion bears the load from the upper cover member with the seal lip sealingly engaging the upper end portion of the lower cover member.

Preferably, the sealing portion includes seal lips projecting on an outer surface of the hollow portion opposite the supporting portion and abutting on the outer peripheral part of the upper end portion of the lower cover member when the upper cover member and the lower cover member are locked together. Therefore, the hollow sealing portion readily deforms with the seal lips deformed in close contact with the outer periphery of the upper end portion of the lower cover member, such that the hollow sealing portion makes a tight seal between the upper and lower cover members.

Desirably, the seal member has a ring-shape conforming to a contour of a peripheral edge of the lower end portion of the upper cover member. Accordingly, the seal member can seal between the entire peripheral edge of the lower end portion of the upper cover member and the entire peripheral edge of the upper end portion of the lower cover member when the upper cover member is locked to the lower cover member.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
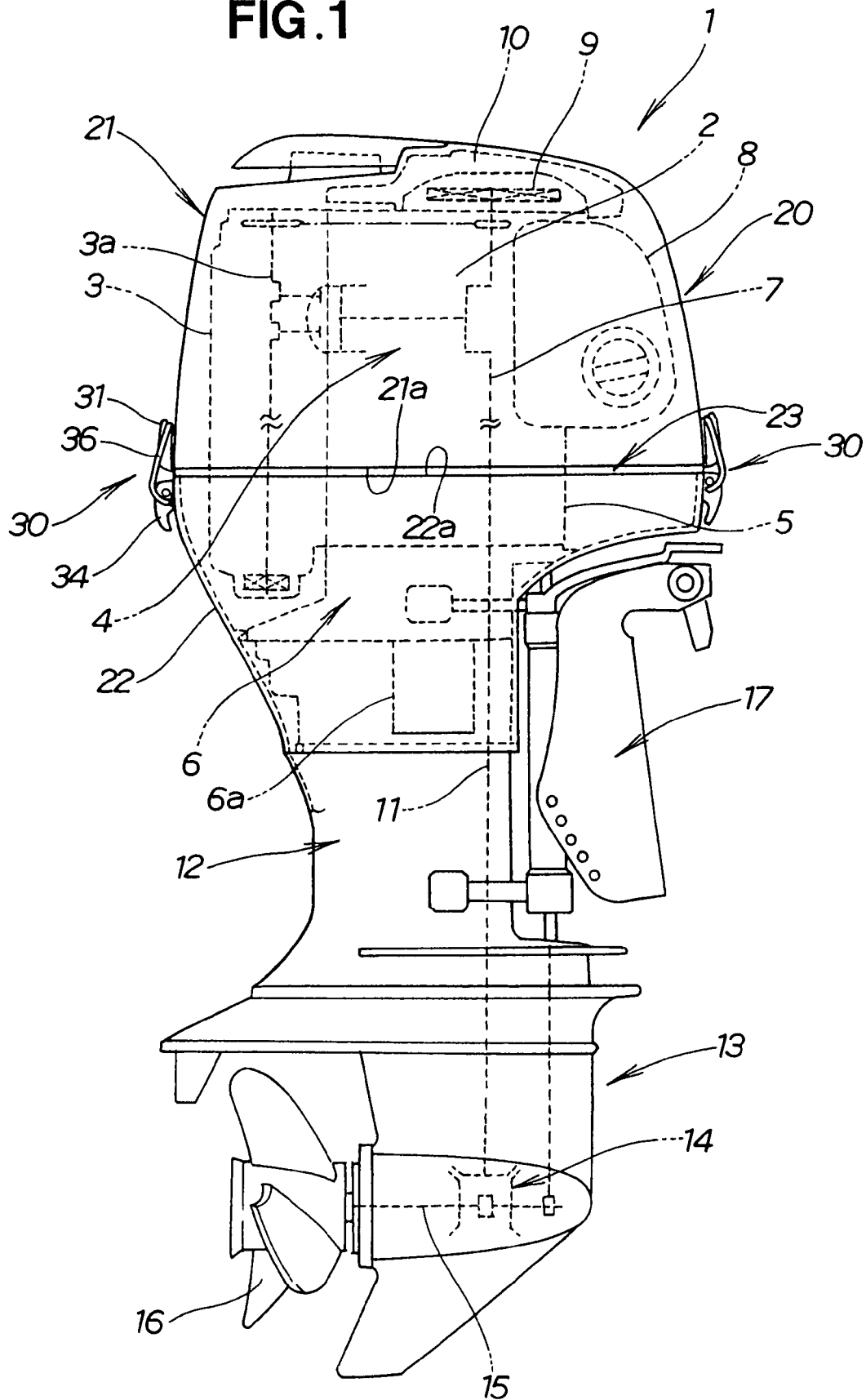
FIG. 1 is a side elevation view of an outboard motor including a seal member according to the present invention.

Referring to FIG. 1, an outboard motor 1 includes an engine cover 20 covering an engine 2 disposed in an upper part of the outboard motor 1. The engine 2 is a four-stroke engine including horizontally-disposed cylinders, horizontally-disposed pistons and a vertically-disposed crankshaft. The engine 2 includes a rear part including cylinder head 3 carrying a cylinder cover, a middle part including a cylinder block 4, and a front part including a crankcase 5 and a mount case 6. The mount case 6 carries an oil pan 6a at a lower part thereof.

The engine cover 20 is halved into an upper cover member 21 and a lower cover member 22. The upper cover member 21 covers a main or upper part of the engine 2 while the lower cover member 22 covers a lower part of the engine 2. Reference numerals 3a, 8, 9, 10 denote a camshaft, an intake silencer, an AC generator and an air guide plate, respectively.

The crankshaft 7 is connected to a downwardly-extending drive shaft 11. The drive shaft 11 vertically extends through an extension case 12 provided under the lower cover member 21 and connects with a gear mechanism 14 disposed in a gear case 13.

The gear mechanism 14 transmits a drive power to a horizontally-disposed driven shaft 15. The driven shaft 15 has its rear end portion projecting rearward from a rear part of the gear case 13. The rear end portion of the driven shaft 15 is connected to a propeller 16. The propeller 16 is connected to a pair of dog clutches (not shown) operable to transmit the drive power from the engine 2 to the propeller 16 in such a manner that the propeller 16 rotates in a forward/reverse direction to produce a thrusting force for traveling a hull (not shown) forward or rearward. The outboard motor 1 is releasably attached via a stern bracket 17 to a stern of the hull.

The engine cover 30 carries front and rear locking mechanisms 30, 30 at front and rear parts thereof, respectively, for locking the upper cover member 21 to the lower cover member 22 with a seal member 40 (FIG. 2 to FIG. 5) interposed between the upper and lower cover members 21, 22, as shown by reference numeral 23. The front and rear locking mechanisms 30, 30 have the same arrangement and, for the purpose of clarity, only the rear locking mechanism 30 will be shown in FIG. 2 to FIG. 4.

Referring to FIG. 2 to FIG. 5, the upper cover member 21 has a lower end portion 21a having a lower peripheral edge of the upper cover member 21. The lower end portion 21a of the lower cover member 21 includes an attachment base 21b having a large thickness. Attached to the attachment base 21b is a catcher 31 with which a lock arm 36 of the locking mechanism 30 comes into and out of engagement. The lower end portion 21a includes a seal attachment part 21d projecting downwardly from a lower end 21c of the attachment base 21b. Attached to the seal attachment part 21d is the seal member 40. The catcher 31 is secured to the attachment base 21b by means of rivets 32, 32 holding washers 33, 33 against the attachment base 21b. The catcher 31 includes an engaging groove portion 31a formed on an upper end thereof. The engaging groove portion 31a has a semicircular contour. The lock arm 36 can engage with or disengage from the engaging groove portion 31a.

The lower cover member 22 includes an upper end portion 22a having an upper peripheral edge of the lower cover member 22. The upper end portion 22a includes a bearing part 22b projecting rearward thereof. The bearing part 22b rotatably supports an operational lever 34 by means of a pin 35. The bearing part 22b has its upper surface defining a horizontal seal surface 22c. The seal surface 22c bears a load applied through the seal member 40 from the upper cover member 21 when the upper cover member 21 is locked to the lower cover member 22 by means of the locking mechanisms 30, 30. The horizontal seal surface 22c has an inner end at an engine-compartment side thereof. From the inner end of the seal surface 22c, a seal wall 22d extends upwardly in a gentle curve. The seal wall 22d has its outer side defining a vertical seal surface 22e.

The locking mechanism 30 includes the operational lever 34 and the lock arm 36. Operation of the lever 34 brings the lock arm 36 into and out of engagement with the engaging groove portion 31a of the catcher 31. The operational lever 34 has a proximal portion 34a supported by the bearing part 22b through the pin 35. The operational lever 34 has one pair of bearing portions 34b, 34b offset from the proximal portion 34a towards a distal portion (not designated) of the lever 34. The lock arm 36 has an inverse-U-shape and includes opposite end portions defining shaft portions 36a, 36a bent towards each other. The shaft portions 36a, 36a are supported by the bearing portions 34b, 34b. When the operational lever 34 is pivoted downwardly on the pin 35, the lock arm 36 is drawn downwardly by the bearing portions 34b, 34b into engagement with the engaging groove portion 31a of the catcher 31, after which the upper cover member 31 is locked to the lower cover member 32.

Figure 5:
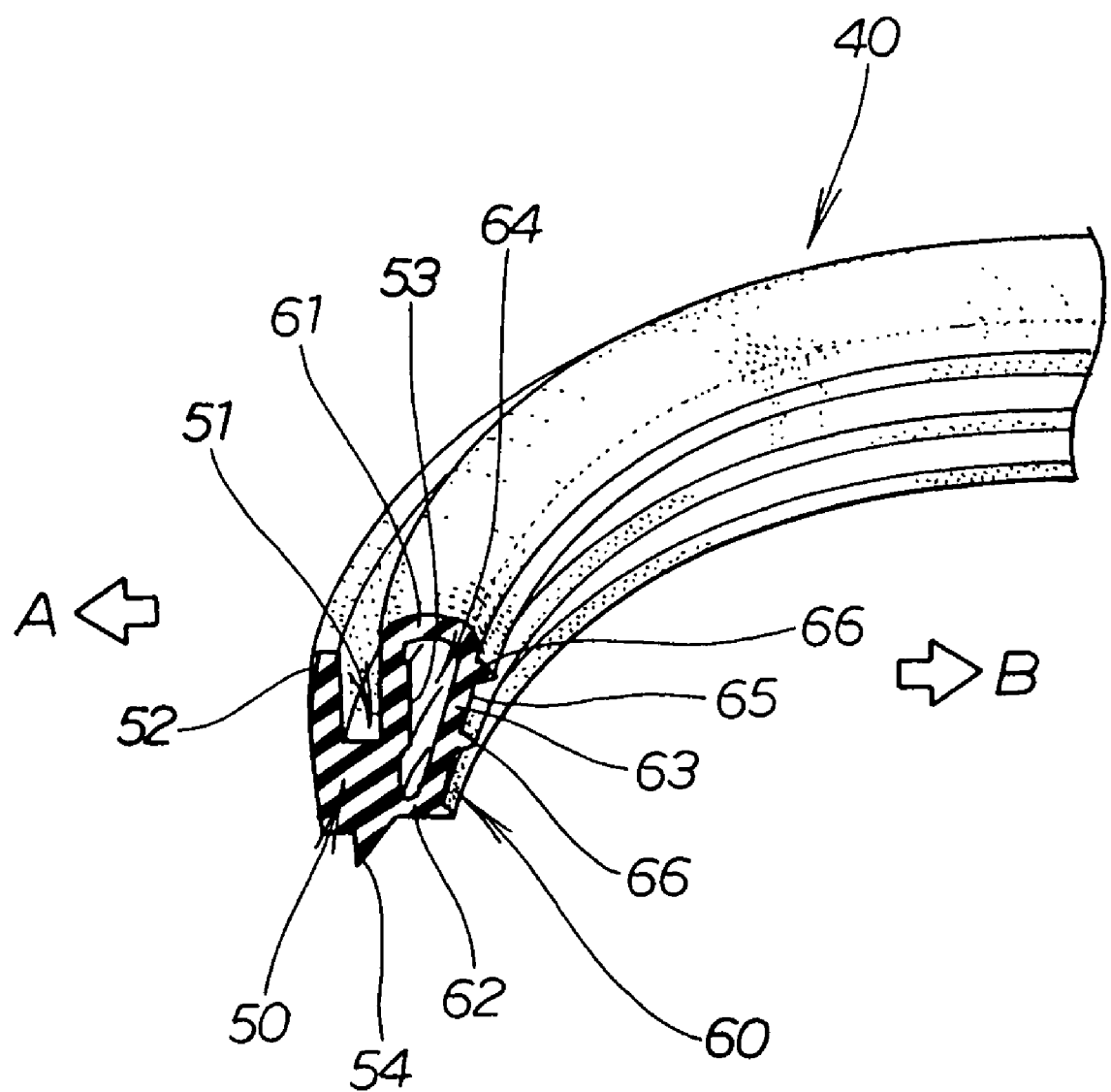
FIG. 5 is a cross-sectional view of the seal member.

In FIG. 5, an arrow A shows a direction towards the outside of an engine compartment defined within the engine cover 20 while an arrow B shows a direction towards the inside of the engine compartment.

The seal member 40 is formed of a flexible elastic material such as rubber, as shown in FIG. 5. The seal member 40 includes a load-bearing (supporting) portion 50 located on the outside of the engine compartment for bearing or supporting the upper cover member 21, and a sealing portion 60 integral with an engine-compartment side of the load-bearing portion 50.

The load-bearing portion 50 includes at its upper part an attachment groove 51 into which the seal attachment part 21d of the lower end portion 21a of the upper cover member 21 is fitted. The load-bearing portion 50 includes an outer wall part 52 formed on the outside of the engine compartment, and an inner wall part 53 formed on the engine-compartment side of the load-bearing portion 50. The outer wall part 52 and the inner wall part 53 define the attachment groove 51 therebetween. The load-bearing portion 50 is thick and solid and has a large spring modulus. The term "large spring modulus" as used herein means to provide small amount of deformation of the load-bearing portion 50 bearing a load from the upper cover member 21 when the upper cover member 21 is locked to the lower cover member 22.

The load-bearing portion 50 includes a seal lip 54 projecting downwardly from a bottom surface of the load-bearing portion 50. The seal lip 54 tapers downwardly.

The sealing portion 60 includes a top wall part 61 extending from a top end of the inner wall part 53 of the load-bearing portion 50 towards the engine compartment, a bottom wall part 62 extending a smaller distance from an inner lower end of the load-bearing portion 50 towards the engine compartment, and an inside wall part 63 interconnecting the top wall part 61 and the bottom wall part 62. The inside wall part 63 extends downwardly obliquely towards the outside of the engine compartment. The top wall part 61 and the inside wall part 63 of the sealing portion 60 and the inner wall part 53 of the load-bearing portion 50 define an inverse-U shape. The sealing portion 60 has a hollow space 64 defined by the top wall part 61, the bottom wall part 62, the inside wall part 63 and the load-bearing portion 50. The hollow space 64 has its width tapering in a downward direction. As shown, the hollow sealing portion 60 is completely closed in section. It will be understood form FIG. 3 that the supporting portion 50 and the sealing portion 60 cooperate to define and surround the hollow space 64 therebetween, and that the hollow space 64 extends down below the recessed groove (attachment groove) 51 of the supporting portion 50.

The inside wall part 63 has two vertically-spaced seal lips 66, 66 of linear shape on an interior surface 65 of the inside wall portion 63. The seal lips 66, 66 sealingly abut on the vertical seal surface 22e of the lower cover member 22 shown in FIG. 2.

The sealing portion 60 has a small spring modulus. The term "small spring modulus" as used herein means to provide large amount of deformation of the sealing portion 60 subjected to a load from the upper cover member 21 when the upper cover member 21 is locked to the lower cover member 22. The spring modulus of the sealing portion 60 is smaller than the spring modulus of the load-bearing portion 50.

The rubber-made seal member 40 is a single piece including the solid load-bearing portion 50 of large spring modulus, which is provided on the outside of the seal member 40, and the hollow sealing portion 60 of small spring modulus, which is provided on the inside of the seal member 40. The seal member 40 is of ring-shape conforming to the contours of the peripheral edge of the lower end portion 21a of the upper cover member 21 and the peripheral edge of the upper end portion 22a of the lower cover member 22.

The seal member 40 is attached to the upper cover member 21 with the recess-shaped attachment groove 51 secured through an adhesive agent to the seal attachment part 21d of the lower end portion 21a. Alternatively, the attachment groove 51 may be press fitted with the seal attachment portion 21d without use of any adhesive agent. Thus, the thick, solid load-bearing portion 50 of large spring modulus is located under the seal attachment part 21d. The sealing portion 60 faces to the vertical seal surface 22e of the lower cover member 22 when the upper cover 21 is aligned with the lower cover member 22 prior to being locked to the lower cover member 22.

Discussion will be made, with reference to FIG. 2 to FIG. 4, as to how the seal member 40 seals the gap between the upper and lower cover members 21, 22 when the upper cover member 21 is locked to the lower cover member 22 by means of the locking mechanisms 30, 30.

Figure 2:
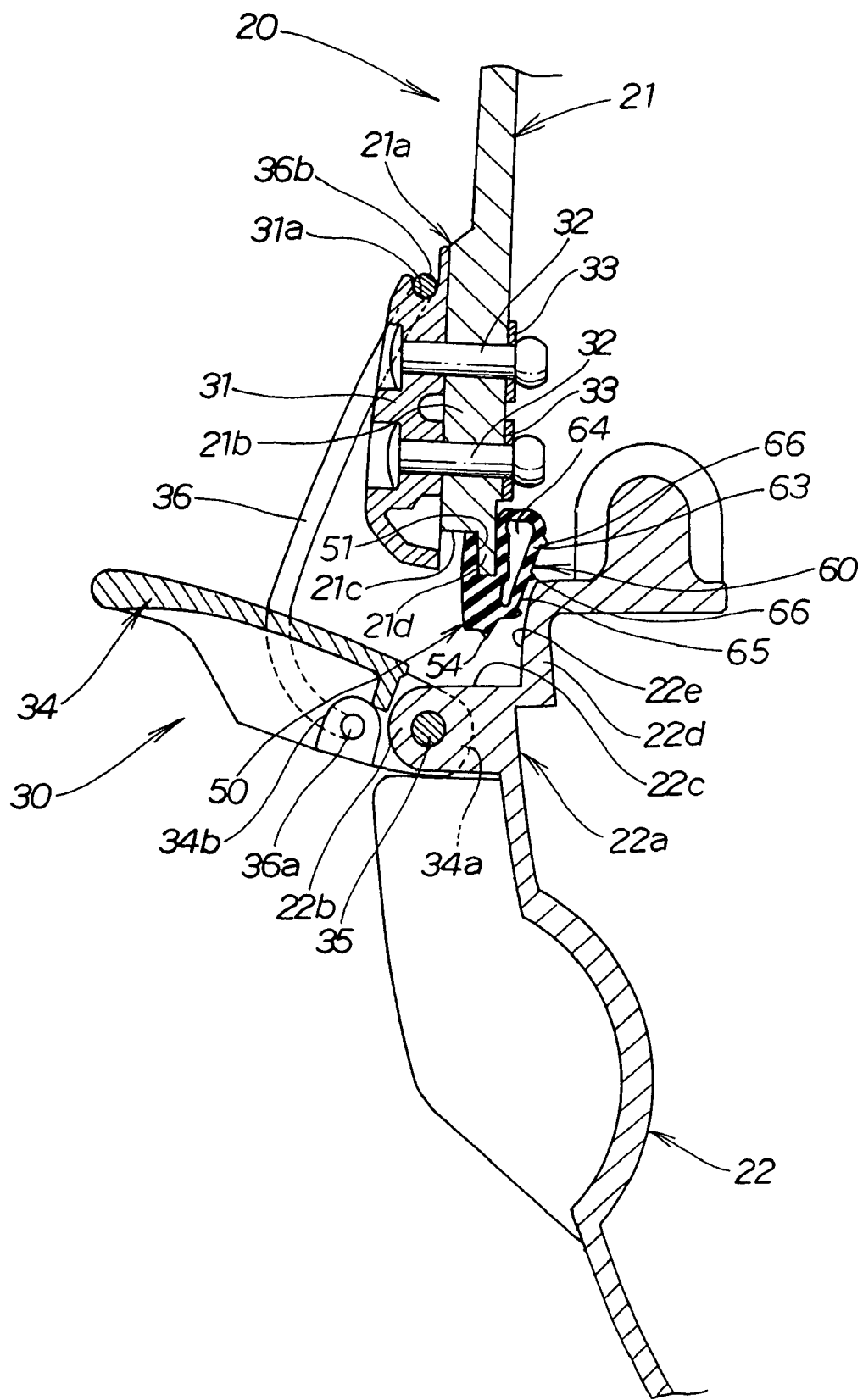
FIG. 2 is a view showing on enlarged scale a lower end portion of an upper cover member and an upper end portion of a lower cover member.

FIG. 2 shows that the lower end portion 21a of the upper cover member 21 and the upper end portion 22a of the lower cover member 22 are vertically aligned with each other prior to being locked together. The bottom surface of the load-bearing portion 50, which carries the seal lip 54, faces to the horizontal seal surface 22e of the lower cover member 22.

The interior surface 65 of the inside wall portion 63 and the seal lips 66, 66 formed on the interior surface 65 face to the vertical seal surface 22e of the lower cover member 22.

The operational lever 34 is pivoted upwardly to move a top portion 36b of the lock arm 36 into engagement with the engaging groove portion 31a. With the top portion 36b engaging the engaging groove portion 31a, the bottom surface of the load-bearing portion 50 is spaced from the horizontal seal surface 22c of the lower cover member 22 whilst the sealing portion 60 is spaced from the vertical seal surface 22e.

Figure 3:
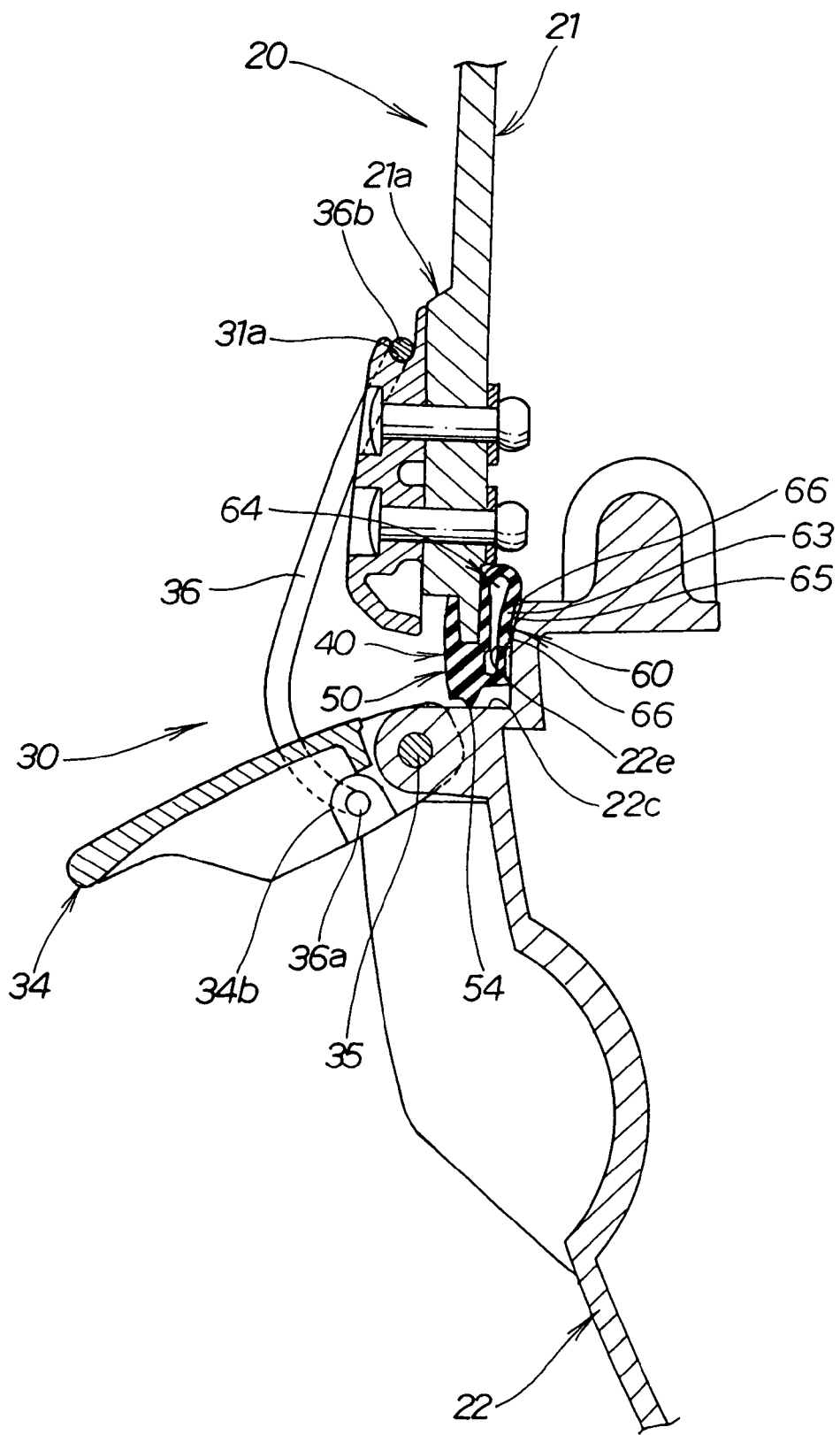
FIG. 3 is a view showing that the upper cover member is on the point of being locked to the lower cover member.

When the operational lever 34 is pivoted downwardly from the position shown in FIG. 2, the lock arm 36 is drawn downwardly, which moves the upper cover member 21 downwardly, as shown in FIG. 3. The seal lip 54 formed on the bottom surface of the load-bearing portion 50 abuts on the horizontal seal surface 22c of the lower cover member 22. The seal lips 66, 66 of the sealing portion 60 abut on the vertical seal surface 22e of the lower cover member 22. The inside wall portion 63 then flexes following the configuration of the vertical seal surface 22e.

Figure 4:
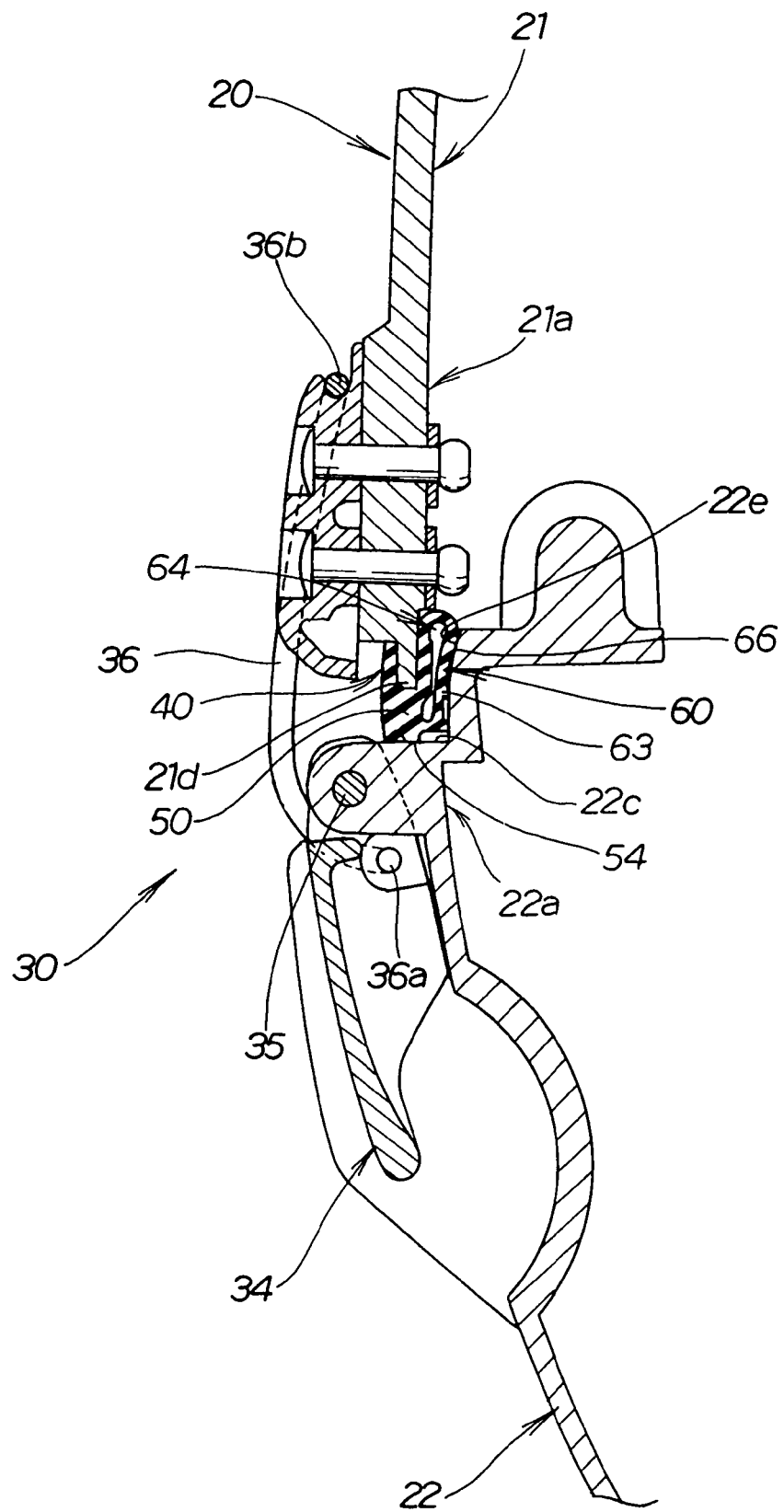
FIG. 4 is a view showing that the upper cover member is locked to the lower cover member.

When the operational lever 34 is pivoted further downwardly from the position shown in FIG. 3, the lock arm 36 is drawn further downwardly, which moves the upper cover member 21 further downwardly into locking engagement with the lower cover member 22, as shown in FIG. 4

The seal lip 54 of the seal member 40 is pressed against the horizontal seal surface 22c of the lower cover member 22 into sealing engagement with the horizontal seal surface 22c.

Since the load-bearing portion 50 has a large height and is solid and thick in addition to providing a large spring modulus, the load-bearing portion 50 is less deformed while the seal lip 54 is deformed or compressed into a flattened state. With the seal lip 54 in the flattened state, the load-bearing portion 50 provides a resilient force while acting directly on the horizontal seal surface 22c. Since an amount of plastic deformation of the load-bearing portion 50 is small, the load applied to the lower cover member 22 does not reduce. That is, without reducing a load applied to the load-bearing portion 50, the upper cover member 21 is reliably locked by means of the locking mechanisms 30, 30 to the lower cover member 22.

Since the sealing portion 60 located on the inside of the load-bearing portion 50 has the hollow space 64, the spring modulus of the sealing portion 60 is small. This small spring modulus enables the sealing portion 60 to deform following the configuration of the vertical seal surface 22e of the lower cover member 22 after the sealing portion 60 abuts on the vertical seal surface 22e. As a result, the sealing portion 60 closely contacts the vertical seal surface 22e, providing an improved seal between the lower end portion 21a of the upper cover member 21 and the upper end portion 22a of the lower cover member 22. The seal lips 66, 66 deform, by being pressed against the vertical seal surface 22e, in close contact with the vertical seal surface 22e.

The seal member 40 is a single integrally-molded member including the load-bearing portion 50 of large spring modulus, and the sealing portion 60 of small spring modulus. The seal member can not only provide the improved seal between the upper and lower cover members 21, 22 but also prevent reduction in load applied to the lower cover member 22 when the upper cover member 21 is locked to the lower cover member 22 through the locking mechanisms 30, 30. Thus, the upper cover member 21 can be reliably locked to the lower cover member 22.

In another embodiment, the lower cover member may have a seal attachment part for attachment of the seal member 40. In still another embodiment, the upper and lower cover members may have seal attachment parts for attachment of the seal member 40.

Obviously, various minor changes and modifications of the present invention are possible in light of the above teaching. It is therefore to be understood that within the scope of the appended claims the invention may be practiced otherwise than as specifically described.

What is claimed is:

1. In an engine cover for an outboard motor, said engine cover including
an upper cover member, and
a lower cover member which is formed with a horizontal seal surface and a substantially vertical seal surface extending integrally upwardly adjacent the horizontal seal surface,
the improvement comprising a seal member for sealing a gap between the upper and lower cover members, the upper cover member being releasably attached to the lower cover member,
the seal member comprising:
a supporting portion disposed on a lower end portion of the upper cover member for supporting the upper cover member relative to the lower cover member, the supporting portion having a recessed groove formed therein for receiving a lower edge portion of the upper cover member, said recessed groove having a floor portion and two opposite side walls;
a hollow sealing portion having cross-sectional wedge shape comprising a plurality of integrally formed walls enclosing an airtight hollow space including an inner wall formed integrally with an engine-compartment side of the supporting portion, an outer wall including a plurality of deformable sealing lips, a top wall interconnecting upper ends of the inner and outer wall and a lower end joining lower portions of the inner and outer walls, which is disposed between an inner surface of an inner peripheral part of a lower end portion of the upper cover member and an outer surface of an outer peripheral part of the upper end portion of the lower cover member, such that the hollow sealing portion and the sealing lips of the outer wall thereof become substantially compressed when the upper cover member and the lower cover member are locked together,
wherein:
the supporting portion and the sealing portion cooperate to define and surround a hollow space therebetween, the hollow space extending down below the recessed groove of the supporting portion;
the supporting portion having a large spring modulus; and
the sealing portion having a spring modulus smaller than the spring modulus of the supporting portion; and
wherein the hollow sealing portion extends both below and above the floor portion of the recessed groove of the supporting portion between said outer surface of lower cover member and said inner surface of the upper cover member.

2. An engine cover according to claim 1, wherein the supporting portion is attached to the lower end portion of the upper cover member.

3. An engine cover according to claim 1, wherein the supporting portion is solid and includes a seal lip projecting from an inner bottom surface of the supporting portion, the seal lip having a small spring modulus and tapering to be narrower in a downward direction.

4. An engine cover according to claim 1, wherein the seal member has a ring-shape conforming to a contour of a peripheral edge of the lower end portion of the upper cover member.

5. An engine cover according to claim 1, wherein the supporting portion attaches to a projection on the lower end portion of the upper cover member, the projection is disposed outwardly of the peripheral part of the upper end portion of the lower cover member, and the hollow sealing portion extends from the supporting portion inwardly of and at a level below the projection and is compressed between an inwardly-facing surface of the projection and an outwardly-facing surface of the upper end portion of the lower cover member.

6. An engine cover according to claim 1, wherein said seal member disposed between the upper cover member and the lower cover member such that an outermost portion of the seal member is disposed inwardly of an outermost portion of said upper cover member.

7. An outboard motor comprising:
an engine cover including an upper cover member having a lower edge portion with a projection extending downwardly thereon, and a lower cover member;
a seal member for sealing a gap between the upper and lower cover members, the upper cover member being releasably attached to the lower cover member,
the seal member comprising:
a supporting portion disposed beneath the projection forming a lowermost end surface of the upper cover member and above an upper surface of the lower cover member for supporting the upper cover member relative to the lower cover member, the supporting portion having a recessed groove formed therein for receiving the projection of the upper cover member;
a hollow sealing portion having cross-sectional wedge shape comprising a plurality of integrally formed walls enclosing an airtight hollow space including an inner wall formed integrally with an engine-compartment side of the supporting portion, an outer wall including a plurality of deformable sealing lips, a top wall interconnecting upper ends of the inner and outer wall and a lower end joining lower portions of the inner and outer walls, which is disposed between an inner surface of an inner peripheral part of a lower end portion of the upper cover member and an outer surface of an outer peripheral part of the upper end portion of the lower cover member, such that the hollow sealing portion and the sealing lips of the outer wall thereof become substantially compressed when the upper cover member and the lower cover member are locked together, wherein:

the supporting portion and the sealing portion cooperate to define and surround a hollow space therebetween, the hollow space extending down below the recessed groove of the supporting portion;

the supporting portion having a large spring modulus;

the sealing portion having a spring modulus smaller than the spring modulus of the supporting portion; and wherein said seal member is disposed between the upper cover member and the lower cover member such that an outermost portion of the seal member is disposed inwardly of an outermost portion of said upper cover member.

8. The outboard motor according to claim 7, further comprising a lever which releasably attaches the upper and lower cover together.

9. The outboard motor according to claim 7, wherein said recessed groove includes a floor portion and two opposite side walls; and wherein the hollow sealing portion extends both below and above the floor portion of the recessed groove of the supporting portion between said outer surface of lower cover member and said inner surface of the upper cover member.

10. An engine cover for an outboard motor, said engine cover including an upper cover member;

a lower cover member which is formed with a horizontal seal surface and a substantially vertical seal surface extending integrally upwardly adjacent the horizontal seal surface;

a seal member for sealing a gap between the upper and lower cover members, the upper cover member being releasably attached to the lower cover member, the seal member comprising:

a supporting portion disposed on a lower end portion of the upper cover member for supporting the upper cover member relative to the lower cover member, the supporting portion having a recessed groove formed therein for receiving a lower edge portion of the upper cover member, said recessed groove having a floor portion;

a hollow sealing portion having cross-sectional wedge shape comprising a plurality of integrally formed walls enclosing an airtight hollow space including an inner wall formed integrally with an engine-compartment side of the supporting portion, an outer wall including a plurality of deformable sealing lips, a top wall interconnecting upper ends of the inner and outer wall and a lower end joining lower portions of the inner and outer walls, which is disposed between an inner peripheral part of a lower end portion of the upper cover member and an outer peripheral part of the upper end portion of the lower cover member, such that the hollow sealing portion and the sealing lips of the outer wall thereof become substantially compressed when the upper cover member and the lower cover member are locked together; said hollow sealing portion extending both below and above the floor portion of the recessed groove;

wherein:

the supporting portion and the sealing portion cooperate to define and surround a hollow space therebetween, the hollow space extending down below the recessed groove of the supporting portion;

the supporting portion has a large spring modulus; and the sealing portion has a spring modulus smaller than the spring modulus of the supporting portion; and wherein said seal member is disposed between the upper cover member and the lower cover member such that an outermost portion of the seal member is disposed inwardly of an outermost portion of said upper cover member.

* * * * *